Feb. 23, 1926.

F. H. LIPPINCOTT 1,574,299

AUTOMATIC DRIVE

Filed March 13, 1924  2 Sheets-Sheet 1

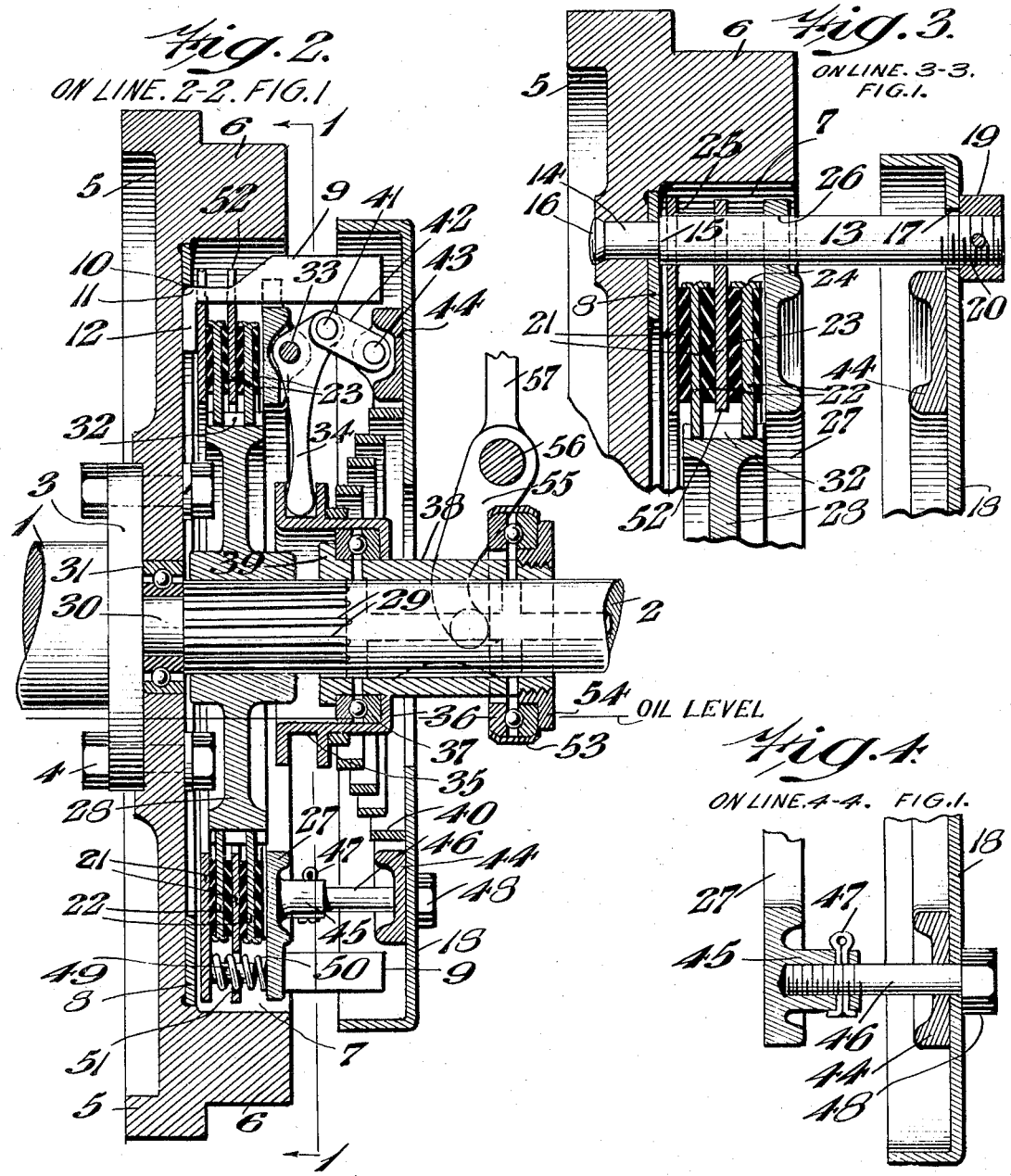

Patented Feb. 23, 1926.

1,574,299

UNITED STATES PATENT OFFICE.

FISHER H. LIPPINCOTT, OF PHILADELPHIA, PENNSYLVANIA.

AUTOMATIC DRIVE.

Application filed March 13, 1924. Serial No. 698,965.

*To all whom it may concern:*

Be it known that I, FISHER H. LIPPINCOTT, a citizen of the United States, residing at Philadelphia, county of Philadelphia, State of Pennsylvania, have invented a new and useful Automatic Drive, of which the following is a specification.

My present invention comprehends a novel construction and arrangement of an automatic drive, wherein driving and driven frictional elements are automatically controlled by centrifugally acting members in order that the power and speed relationship can be automatically varied between the driving and the driven members.

The driving and driven friction elements consist of a desired number of sets of driving and driven friction elements, each set containing one or more of such elements, and these friction elements together with their automatic control co-operate with and preferably form an integral part of a clutch which is also under the control of the operator.

It further comprehends a novel construction and arrangement of an automatic drive, wherein the frictional grip between the automatically controlled friction elements is capable of being mechanically controlled by a pressure transmitting member which is retained in position by resilient means, the strength of which is amplified by power amplifying means disposed between the pressure transmitting member and the resilient means.

It further comprehends a novel construction and arrangement of a driving and a driven member and parts co-operating therewith, including driving and driven friction discs, centrifugally controlled levers, pressure transmitting and pressure resisting members, the relative movement of which in one direction can be limited, and, if desired, adjusted, and a novel construction and arrangement of a lever system through which the pressure of resilient means is exerted between pressure transmitting and pressure resisting members.

It further comprehends a novel friction element, the frictional grip of which is adapted to be automatically controlled, such friction element having embodied in it and forming a component part thereof material of a lubricating nature.

Other novel features of construction and advantage will hereinafter more clearly appear in the detailed description and the appended claims.

For the purpose of illustrating the invention, I have shown in the accompanying drawings a typical embodiment of it, which, in practice, will give reliable and satisfactory results. It is however to be understood that this embodiment is typical only and that the various instrumentalities of which my invention consists can be variously arranged and organized, and that the invention is not limited to the precise arrangement and organization of these instrumentalities as herein set forth.

Figure 2 is a section on line 2—2 of Figure 1.

Figure 3 is a section on line 3—3 of Figure 1.

Figure 4 is a section on line 4—4 of Figure 1.

Similar numerals of reference indicate corresponding parts.

Figure 1:
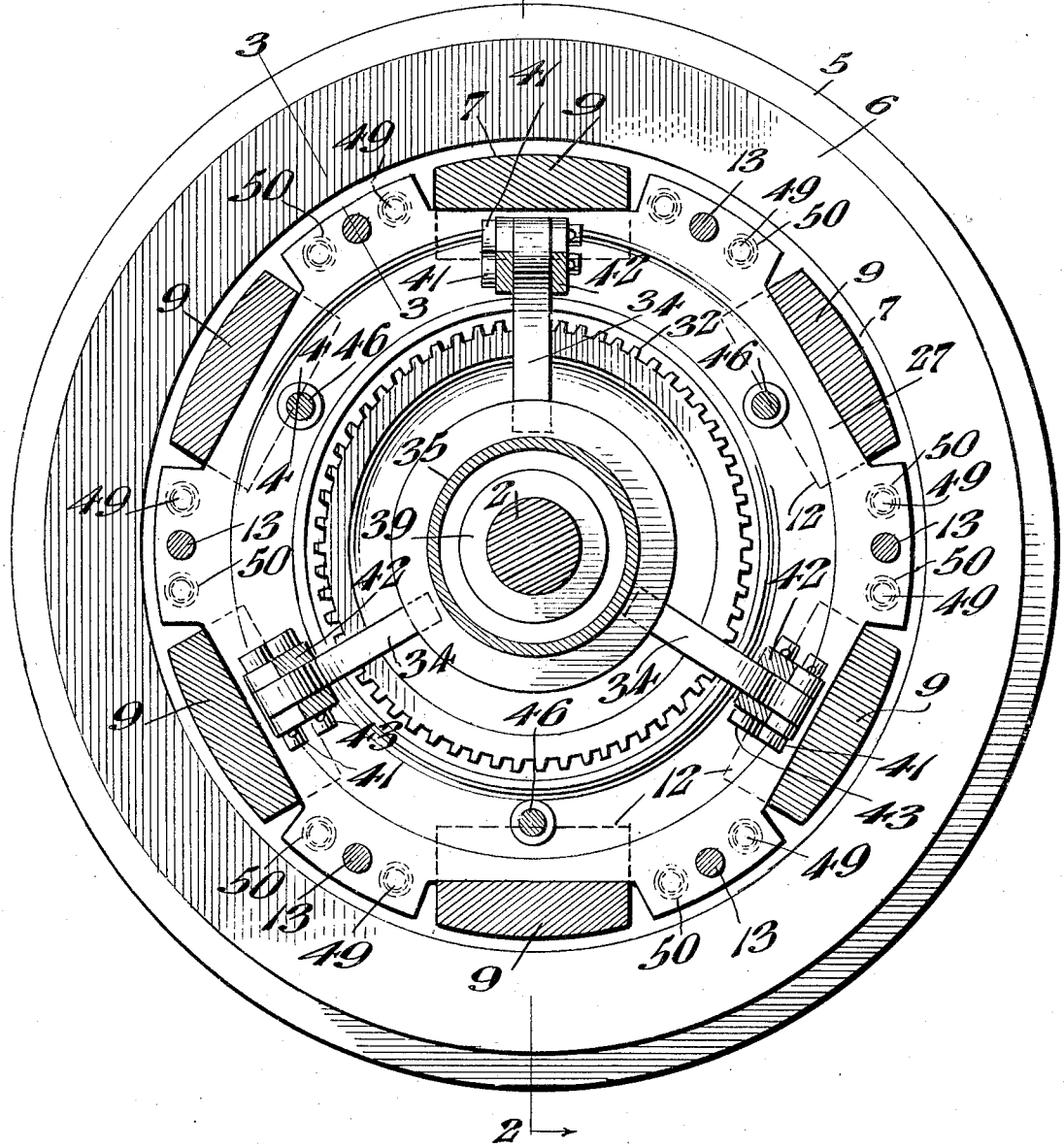
Figure 1 is a section on line 1—1 of Figure 2 of an automatic drive embodying my invention.

Referring to the drawings:

1 designates a driving member which may be the driving or engine shaft, and 2 designates a driven member which may be the driven shaft. The driving shaft 1 is provided with a head 3, to which is secured by means of fastening devices 4, a fly wheel 5, having a lateral flange 6, thereby forming an internal recess or chamber 7. 8 designates a bearing ring, with which co-operates centrifugally controlled levers which at their outer ends are weighted. These levers 9 are fulcrumed at 10 on the bearing ring 8, and are provided with a recess 11 forming a clearance. The centrifugally controlled levers 9 are also provided with the inwardly extended lugs 12, opposite faces of which are preferably substantially parallel. The bearing ring 8 is secured in assembled position with respect to the fly wheel 5 by means of the driving pins 13, which are provided with the reduced extensions 14, thereby forming shoulders 15, which bear against the bearing ring 8. The driving pins 13 pass through the fly wheel and have their ends, juxtaposed to the fly wheel, swaged or upset as indicated at 16. The driving pins 13 pass through the apertures 17 in a flanged disc 18, and, at their opposite ends, such driving pins are threaded in order to adapt them to receive the nuts 19, which are fixed in their adjusted position by means of the pins 20. 21 designates driving friction discs, and 22 designates driven friction discs. These friction discs preferably form sets, and each set may consist of one or more friction discs in accordance with the results it is desired to obtain in practice. As illustrated, I have shown two driving friction discs and two driven friction discs, which co-operate with a third set of friction discs 23, the outward movement of which is prevented by deflecting or swaging over the outer ends of the driven friction discs as indicated at 24.

The driving friction discs 21 are apertured as at 25 in order to be slidably mounted on the driving pins 13, and these driving pins also pass through the apertures 26 in a pressure transmitting member 27, which is preferably in the form of a channelled ring. The driven friction discs 22 are intergeared with a support 28, which is keyed, as at 29, to the driven shaft 2. This driven shaft 2 is provided with a reduced extension 30 at its inner end, which is mounted in the anti-friction bearing 31 carried by the fly wheel 5. The teeth 32 on the support 28 are clearly shown in Figures 1, 2 and 3. It will be seen from Figure 2 that this support is in the form of a disc. The pressure transmitting member 27 has fulcrumed thereon as at 33, the levers 34, the inner ends of which are preferably rounded and received in the annular groove of a clutch sleeve 35, having an inturned flange 36. An antifriction bearing 37 is mounted between the clutch sleeve flange 36 and a flange 39 on a clutch sleeve 38. The clutch sleeve 38 is loosely mounted on the driven shaft 2. 40 designates a spring, one end of which bears against the disc 18, and at its opposite end such spring bears against the clutch sleeve 35, so that the tendency of such spring is to move the clutch sleeve 35 to the left of its position as seen in Figure 2. The levers 34 having pivotally connected therewith at 41 the links 42, which are also pivotally connected at 43 with a pressure resisting member 44, which is secured in any desired manner to the body portion of the disc 18. The nuts 19 on the driving pins 13 contribute to limit the outward movement of the disc 18. The pressure transmitting member 27 is provided with the internally threaded hubs 45, with which engage the studs 46, which are retained in the adjusted position by means of the cotter pins 47. These studs 46 are in the form of bolts which pass through the pressure resisting member 44 and the disc 18 and are provided with the heads 48, so that these studs 46 also serve to limit the outward movement of the disc 18 relatively to the pressure transmitting member 27.

The driving friction disc 21, which contacts with the lugs 12 of the centrifugally controlled levers 9, has extending therefrom the studs 49 which position the springs 50, interposed between the first driving friction disc and the pressure transmitting member 27. The second driving friction disc is apertured as at 51 in order to permit the springs 50 to pass therethrough.

The centrifugally controlled levers 9 are elongated as will be understood from reference to Figure 1, and, in order to provide a more compact construction, the driving friction discs 21 are recessed as at 52. The friction discs 23 preferably have material embodied therein of a lubricating nature, and the other friction discs may be of similar construction, if desired.

The clutch sleeve 38 has thereon an anti-friction bearing 53 which bears against a thrust collar 54 in threaded engagement with the clutch sleeve 38, and the free end of a lever 55 bears against the anti-friction bearing 53. This lever 55 is fulcrumed at 56 to a stationary portion of the machine in conjunction with which the automatic drive is to be employed, and is provided with an arm 57 which is connected to the usual foot pedal, so that it can be operated at the will of the operator.

The operation of my novel automatic drive will now be apparent to those skilled in this art and is as follows:

When the automatic drive is in the position seen in Figure 2, the parts are in their declutched position. The centrifugally controlled levers 9 are in their normal inward position and there is a slight clearance between the friction elements.

The disc 18, which, with the member 44 connected therewith, forms a pressure resisting member, has its outward or right hand movement limited by the nuts 19, while the inward or left hand movement of the member 27 is limited by the bolts 46. If sufficient wear of the friction discs takes place to require adjustment it can be made by tightening the nuts 19 which cause the advance as a unit of structure of the members 18 and 27.

The stroke or movement of the friction discs under centrifugal action is less than the stroke or movement of the clutch sleeve 38 when actuated by the foot pedal to declutch.

When the centrifugally controlled levers are in their extreme outward position, the movement of the lever arms which co-operate directly with the friction elements is in the construction illustrated one-sixteenth of an inch, while the movement of the manually controlled parts is one-eighth of an inch, thus rendering it possible to manually declutch at any time the operator may desire irrespective of whether the centrifugally controlled levers are in their inward or outward positions.

These levers are retained in their normal position, by means of the springs 50 until the engine or driving shaft 1 reaches a predetermined speed. As the speed of the driving shaft, or in other words the speed of the engine, increases above the determined speed standard, the levers 9 move outwardly due to centrifugal action, thereby causing their lugs 12 to effect the desired frictional grip between the driving and the driven friction discs 21 and 22 respectively and the intermediate friction discs 23 and the pressure transmitting member 27.

As the speed of the driving member decreases or falls to the predetermined standard of speed, the weighted ends of the levers 9 will move inwardly, thereby permitting lateral movement of the friction discs, and thus effect the release of the friction between the driving, driven and intermediate friction discs.

When the maximum strength of the spring 40 is reached, the spring 40 compresses, and allows the weighted ends of the centrifugally controlled levers 9 to move to their extreme outward positions.

Special attention is directed to the novel power multiplying or amplifying means between the clutch sleeve 35 and the pressure transmitting member 27. The levers 34 and the links 42, have the effect of toggles due to the manner in which they are connected to the pressure transmitting member 27 and the pressure resisting member 44, and they serve to multiply the power of the spring 40, so that the foot pedal can be easily actuated by the operator. If it were not for this it would be necessary to make the spring 40 of such excessive strength that it would be difficult for the operator to actuate the foot pedal.

In so far as I am aware I am the first in the art to employ in an automatic drive, which is automatically controlled and which at the same time can be controlled at the will of the operator, power amplifying means between the automatically controlled friction discs and the resilient means of a predetermined standard of tension or resiliency which determines the standard of speed at which the clutching action takes place.

The lower portion of the automatic drive is submerged in lubricant which is contained within the casing of the clutch in the usual manner so that it is not necessary to have the fly wheel form with the pressure resisting member a closed casing.

Having thus described my invention, what I claim as new and desire to secure by Letters Patent, is:

1. In an automatic drive, a driving member, a driven member, driving and driven friction members contributing to form an operative connection between said driving and driven members, means automatically controlled by and in accordance with the speed of said driving member to vary the degree of friction between the friction members, resilient means tending to cause the clutching engagement of said friction members, and power amplifying means between said resilient means and said friction members.

2. In an automatic drive, a driving member, a driven member, driving and driven friction members contributing to form an operative connection between said driving and driven members, means automatically controlled by and in accordance with the speed of said driving member to vary the degree of friction between the friction members, resilient means tending to cause the clutching engagement of said friction members, power amplifying means between said resilient means and said friction members, and means including said resilient means and power amplifying means and under the control of the operator to effect the release of said friction members.

3. In an automatic drive, a driving member, a driven member, driving and driven friction members contributing to form an operative connection between said driving and driven members, means automatically controlled by and in accordance with the speed of said driving member to vary the degree of friction between the friction members, a pressure transmitting member to co-operate with said friction members, a pressure resisting member having limited relative movement with respect to said pressure transmitting member, resilient means tending to cause the clutching engagement of said friction members, and power amplifying means beween said resilient means and said pressure transmitting member.

4. In an automatic drive, a driving member, a driven member, driving and driven friction members contributing to form an operative connection between said driving and driven members, a pressure transmitting member to co-operate with said friction members, means automatically controlled by and in accordance with the speed of said driving member to vary the degree of friction between the friction members, a pressure resisting member having limited relative movement with respect to said pressure transmitting member, resilient means tending to cause the clutching engagement of said friction members, and power amplifying means connected with said pressure transmitting and resisting members and transmitting the stresses between said resilient means and said pressure transmitting member.

5. In an automatic drive, a driving member, a driven member, driving and driven friction members contributing to form an operative connection between said driving and driven members, means automatically controlled by and in accordance with the speed of said driving member to vary the degree of friction between the friction members, a pressure transmitting member to co-operate with said friction members, a presure resisting member having limited relative movement with respect to said pressure transmitting member, resilient means to retain said friction members in operative relation, and resilient means between the first in order of said driving friction members and said pressure transmitting member.

6. In an automatic drive, a driving member, driving pins driven thereby, a driven member, driving friction discs, slidably mounted on said driving pins, driven friction discs intergeared with said driven member, and also slidably mounted, a pressure transmitting member co-operating with said discs, levers fulcrumed on said pressure transmitting member, a pressure resisting member having limited relative movement with respect to said pressure transmitting member and to which said levers are linked, resilient means between said pressure resisting member and said levers, and centrifugally controlled means co-operating with said friction discs.

7. In an automatic drive, a driving member, pins driven thereby, driving friction discs slidable on said driving pins, a driven member, driven friction discs co-operating with said driving friction discs and driving said driven member, a pressure transmitting member against which one of said friction discs bears, a pressure resisting member, connections between said pressure transmitting and pressure resisting members to limit their relative movement in one direction, a clutch sleeve slidably mounted, a spring between said pressure resisting member and said clutch sleeve, and power amplifying means forming an operative connection between said clutch sleeve and said pressure transmitting member.

8. In an automatic drive, a driven fly wheel, driving pins carried thereby, driving friction members slidable on said pins, a pressure resisting member having its movement limited in one direction by said pins, driven friction members, a pressure transmitting member co-operating with said friction members, fastening devices to permit relative movement in one direction of said pressure transmitting and pressure resisting members and to prevent their relative movement in the opposite direction, a clutch sleeve under the control of the operator, resilient means between said clutch sleeve and pressure resisting member, and power amplifying means to transmit the stresses between said clutch sleeve and said pressure transmitting member.

9. In an automatic drive, a driven fly wheel, driving pins carried thereby, driving friction members slidable on said pins, a pressure resisting member having its movement limited in one direction by said pins, driven friction members, a pressure transmitting member co-operating with said friction members, fastening devices to permit relative movement in one direction of said pressure transmitting and pressure resisting members and to prevent their relative movement in the opposite direction, a clutch sleeve under the control of the operator, resilient means between said clutch sleeve and pressure resisting member, and power amplifying means to transmit the stresses between said clutch sleeve and said pressure transmitting member, and between said pressure transmitting and pressure resisting members.

FISHER H. LIPPINCOTT.